US012771830B2

(12) United States Patent
Bross et al.

(10) Patent No.: US 12,771,830 B2
(45) Date of Patent: Oct. 20, 2026

(54) INTRA-PREDICTION CONCEPT FOR MULTI-COMPONENT PICTURE CODING INCLUDING MATRIX-BASED INTRA PREDICTION MODES

(71) Applicant: FRAUNHOFER-GESELLSCHAFT ZUR FÖRDERUNG DER ANGEWANDTEN FORSCHUNG E.V., Munich (DE)

(72) Inventors: Benjamin Bross, Berlin (DE); Detlev Marpe, Berlin (DE); Philipp Merkle, Berlin (DE); Jonathan Pfaff, Berlin (DE); Heiko Schwarz, Berlin (DE); Björn Stallenberger, Berlin (DE); Adam Wieckowski, Berlin (DE); Thomas Wiegand, Berlin (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 139 days.

(21) Appl. No.: 18/767,502

(22) Filed: Jul. 9, 2024

(65) Prior Publication Data

US 2025/0024028 A1 Jan. 16, 2025

(30) Foreign Application Priority Data

Jul. 10, 2023 (EP) .................................... 23184567

(51) Int. Cl.
*H04N 19/11* (2014.01)
*H04N 19/105* (2014.01)
(Continued)

(52) U.S. Cl.
CPC ........... *H04N 19/11* (2014.11); *H04N 19/105* (2014.11); *H04N 19/119* (2014.11); *H04N 19/132* (2014.11); *H04N 19/159* (2014.11); *H04N 19/172* (2014.11); *H04N 19/176* (2014.11); *H04N 19/186* (2014.11); *H04N 19/61* (2014.11); *H04N 19/70* (2014.11); *H04N 19/109* (2014.11)

(58) Field of Classification Search
CPC .... H04N 19/11; H04N 19/105; H04N 19/119; H04N 19/132; H04N 19/159; H04N 19/172; H04N 19/176; H04N 19/186; H04N 19/61; H04N 19/70; H04N 19/109; H04N 19/593; H04N 19/96
USPC .................................................... 375/240.02
See application file for complete search history.

(56) References Cited

U.S. PATENT DOCUMENTS

2022/0159263 A1* 5/2022 Wang .................. H04N 19/132
2023/0143945 A1* 5/2023 Koo .................... H04N 19/159 375/240.02

FOREIGN PATENT DOCUMENTS

WO WO-2021198402 A1 * 10/2021 ........... H04N 19/186

* cited by examiner

*Primary Examiner* — Matthew K Kwan
(74) *Attorney, Agent, or Firm* — Sage Patent Group

(57) ABSTRACT

Concepts for applying intra-prediction in multi-component or color picture or video coding in a manner achieving a more efficient coding are described. A decoder for decoding a picture is configured to derive a color sampling format and a partitioning scheme from one more first syntax elements in a data stream. The decoder is configured to decode a first color component and a second color component. The decoder is configured to determine a second-color-component intra-prediction mode index from the data stream.

15 Claims, 4 Drawing Sheets

(51) Int. Cl.

| | |
|---|---|
| ***H04N 19/109*** | (2014.01) |
| ***H04N 19/119*** | (2014.01) |
| ***H04N 19/132*** | (2014.01) |
| ***H04N 19/159*** | (2014.01) |
| ***H04N 19/172*** | (2014.01) |
| ***H04N 19/176*** | (2014.01) |
| ***H04N 19/186*** | (2014.01) |
| ***H04N 19/61*** | (2014.01) |
| ***H04N 19/70*** | (2014.01) |

INTRA-PREDICTION CONCEPT FOR MULTI-COMPONENT PICTURE CODING INCLUDING MATRIX-BASED INTRA PREDICTION MODES

CROSS-REFERENCE TO RELATED APPLICATION AND CLAIM OF PRIORITY

This application claims priority under 35 U.S.C. § 119(a) to European Patent Application No. EP23184567.8 filed on Jul. 10, 2023. The above-identified patent applications are hereby incorporated by reference in their entirety.

TECHNICAL FIELD

Embodiments according to the disclosure relate to multi-component color picture or video coding and a concept for applying intra-prediction including matrix-based intra prediction modes such as in VVC.

BACKGROUND

It is known in various block-based video coders to offer intra-predicted block of a color component to adopt the intra-prediction mode used for another component. Further, codecs like VVC, offer matrix-based intra prediction modes in addition to the usual DC, planar and directional modes.

SUMMARY OF THE INVENTION

It is desired to provide concepts for applying intra-prediction in multi-component or color picture or video coding in a manner achieving a more efficient coding.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

The drawings are not necessarily to scale emphasis instead generally being placed upon illustrating the principles of the disclosure. For a more complete understanding of the present disclosure and its advantages, reference is now made to the following description taken in conjunction with the accompanying drawings, in which like reference numerals represent like parts.

DETAILED DESCRIPTION OF THE EMBODIMENTS

Figure 1:
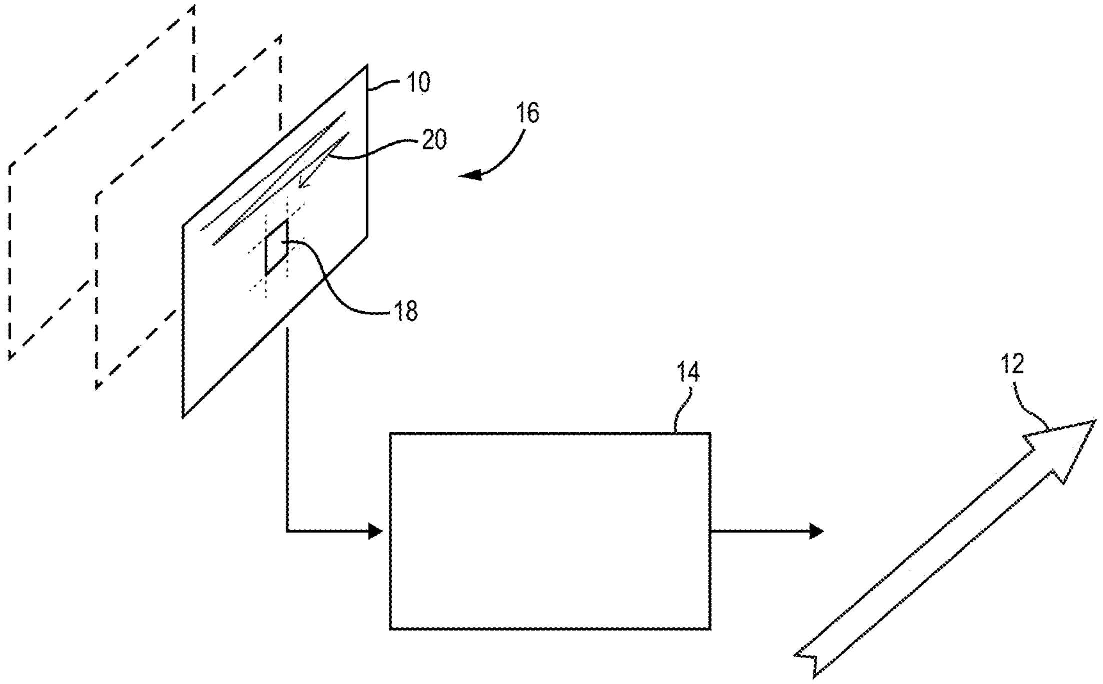
FIG. 1 illustrates an example encoder for encoding a picture or video into a data stream into which embodiments of the present invention may be built in accordance with embodiments of the present disclosure.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Equal or equivalent elements or elements with equal or equivalent functionality are denoted in the following description by equal or equivalent reference numerals even if occurring in different figures.

In the following description, a plurality of details is set forth to provide a more throughout explanation of embodiments of the present disclosure. However, it will be apparent to those skilled in the art that embodiments of the present invention may be practiced without these specific details. In other instances, well-known structures and devices are shown in block diagram form rather than in detail in order to avoid obscuring embodiments of the present invention. In addition, features of the different embodiments described herein after may be combined with each other, unless specifically noted otherwise.

In the following, different examples, embodiments and aspects will be described. At least some of these examples, embodiments and aspects refer, inter alia, to methods and/or apparatus for video coding and/or for performing block-based Predictions e.g. using linear or affine transforms with neighboring sample reduction and/or for optimizing video delivery (e.g., broadcast, streaming, file playback, etc.), e.g., for video applications and/or for virtual reality applications.

Further, examples, embodiments and aspects may refer Versatile Video Coding (VVC) or successors. Also, further embodiments, examples and aspects will be defined by the enclosed claims.

It should be noted that any embodiments, examples and aspects as defined by the claims can be supplemented by any of the details (features and functionalities) described in the following chapters.

Also, the embodiments, examples and aspects described in the following chapters can be used individually, and can also be supplemented by any of the features in another chapter, or by any feature included in the claims.

Also, it should be noted that individual, examples, embodiments and aspects described herein can be used individually or in combination. Thus, details can be added to each of said individual aspects without adding details to another one of said examples, embodiments and aspects.

It should also be noted that the present disclosure describes, explicitly or implicitly, features of decoding and/or encoding system and/or method.

Moreover, features and functionalities disclosed herein relating to a method can also be used in an apparatus. Furthermore, any features and functionalities disclosed herein with respect to an apparatus can also be used in a corresponding method. In other words, the methods disclosed herein can be supplemented by any of the features and functionalities described with respect to the apparatuses.

Also, any of the features and functionalities described herein can be implemented in hardware or in software, or using a combination of hardware and software, as will be described in the section "implementation alternatives".

Moreover, any of the features described in parentheses ("( . . . )" or "[ . . . ]") may be considered as optional in some examples, embodiments, or aspects.

In order to ease the understanding of the following examples of the present application, the description starts with a presentation of possible encoders and decoders fitting thereto into which the subsequently outlined examples of the present application could be built. FIG. 1 shows an apparatus for block-wise encoding a picture 10 into a data stream 12. The apparatus may be a still picture encoder or a video encoder. In other words, picture 10 may be a current picture out of a video 16 when the encoder 14 is configured to encode video 16 including picture 10 into data stream 12, or encoder 14 may encode picture 10 into data stream 12 exclusively.

As mentioned, encoder 14 performs the encoding in a block-wise manner or block-based. To this, encoder 14 subdivides picture 10 into blocks, units of which encoder 14 encodes picture 10 into data stream 12. Examples of possible subdivisions of picture 10 into blocks 18 are set out in more detail below. Generally, the subdivision may end-up into blocks 18 of constant size such as an array of blocks arranged in rows and columns. Alternatively, the subdivision may end-up into blocks 18 of different block sizes such as by use of a hierarchical multi-tree subdivisioning with starting the multi-tree subdivisioning from the whole picture area of picture 10 or from a pre-partitioning of picture 10 into an array of tree blocks. These examples shall not be treated as excluding other possible ways of subdivisioning picture 10 into blocks 18.

Further, encoder 14 is a predictive encoder configured to predictively encode picture 10 into data stream 12. For a certain block 18 this means that encoder 14 determines a prediction signal for block 18 and encodes the prediction residual, i.e. the prediction error at which the prediction signal deviates from the actual picture content within block 18, into data stream 12.

Encoder 14 may support different prediction modes so as to derive the prediction signal for a certain block 18. The prediction modes, which are of importance in the following examples, are intra-prediction modes according to which the inner of block 18 is predicted spatially from neighboring, already encoded samples of picture 10. The encoding of picture 10 into data stream 12 and, accordingly, the corresponding decoding procedure, may be based on a certain coding order 20 defined among blocks 18. For instance, the coding order 20 may traverse blocks 18 in a raster scan order such as row-wise from top to bottom with traversing each row from left to right, for instance. In case of hierarchical multi-tree based subdivisioning, raster scan ordering may be applied within each hierarchy level, wherein a depth-first traversal order may be applied, i.e. leaf nodes within a block of a certain hierarchy level may precede blocks of the same hierarchy level having the same parent block according to coding order 20. Depending on the coding order 20, neighboring, already encoded samples of a block 18 may be located usually at one or more sides of block 18. In some of the examples presented herein, neighboring, already encoded samples of a block 18 are located to the top of, and to the left of block 18.

Intra-prediction modes may not be the only ones supported by encoder 14. In case of encoder 14 being a video encoder, for instance, encoder 14 may also support inter-prediction modes according to which a block 18 is temporarily predicted from a previously encoded picture of video 16. Such an inter-prediction mode may be a motion-compensated prediction mode according to which a motion vector is signaled for such a block 18 indicating a relative spatial offset of the portion from which the prediction signal of block 18 is to be derived as a copy. Additionally, or alternatively, other non-intra-prediction modes may be available as well such as inter-prediction modes in case of encoder 14 being a multi-view encoder, or non-predictive modes according to which the inner of block 18 is coded as is, i.e. without any prediction.

Figure 2:
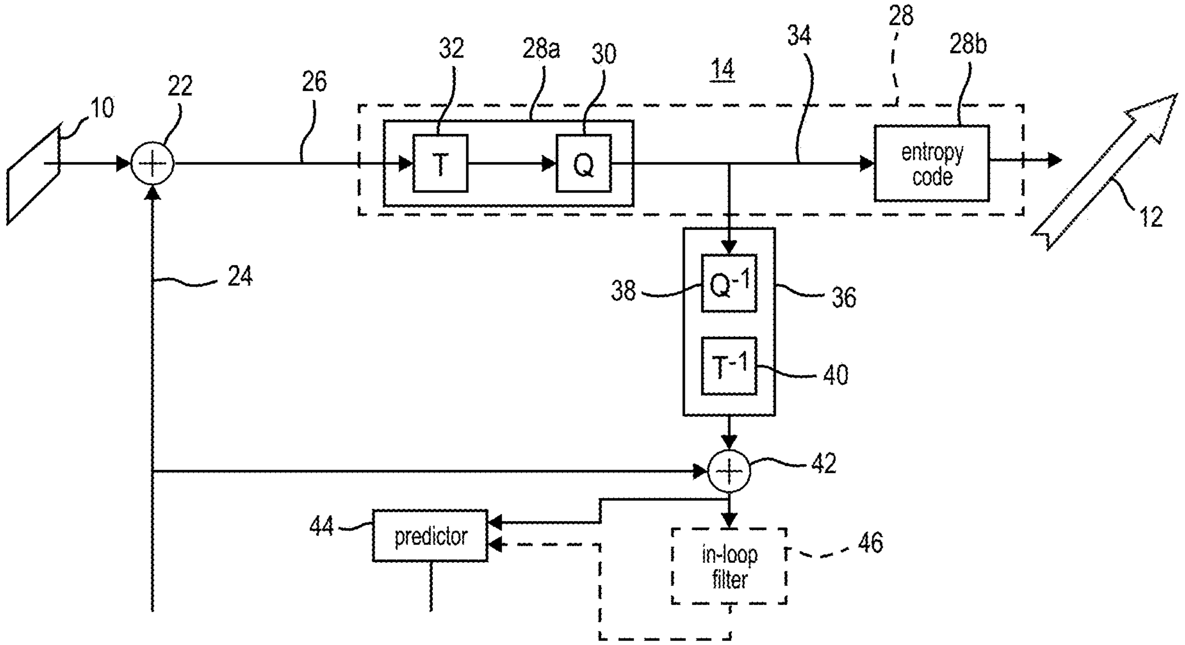
FIG. 2 illustrates a further, more detailed example of an encoder for encoding a picture or video into a data stream into which embodiments of the present invention may be built in accordance with embodiments of the present disclosure.

Before starting with focusing the description of the present application onto intra-prediction modes, a more specific example for a possible block-based encoder, i.e. for a possible implementation of encoder 14, as described with respect to FIG. 2 with then presenting two corresponding examples for a decoder fitting to FIGS. 1 and 2, respectively.

FIG. 2 shows a possible implementation of encoder 14 of FIG. 1, namely one where the encoder is configured to use transform coding for encoding the prediction residual although this is merely one example and the present application is not restricted to that sort of prediction residual coding. According to FIG. 2, encoder 14 comprises a subtractor 22 configured to subtract from the inbound signal, i.e. picture 10 or, on a block basis, current block 18, the corresponding prediction signal 24 so as to obtain the prediction residual signal 26 which is then encoded by a prediction residual encoder 28 into a data stream 12. The prediction residual encoder 28 is composed of a lossy encoding stage 28*a* and a lossless encoding by the entropy encoder 28*b*. The lossy encoding stage 28*a* receives the prediction residual signal 26 and comprises a quantizer 30 which quantizes the samples of the prediction residual signal 26. As already mentioned above, the present example uses transform coding of the prediction residual signal 26 and accordingly, the lossy encoding stage 28*a* comprises a transform 32 connected between subtractor 22 and quantizer 30 so as to transform such a spectrally decomposed prediction residual signal 26 with a quantization of quantizer 30 taking place on the transformed coefficients to present the prediction residual signal 26. The transform may be a DCT, DST, FFT, Hadamard transform or the like. The transformed and quantized prediction residual signal 34 is then subject to lossless coding by the lossless encoding by the entropy encoder 28*b* which is an entropy coder entropy coding quantized prediction residual signal 34 into data stream 12. Encoder 14 further comprises the prediction residual signal reconstruction stage 36 connected to the output of quantizer 30 so as to reconstruct from the transformed and quantized prediction residual signal 34 the prediction residual signal in a manner also available at the decoder, i.e. taking the coding loss is quantizer 30 into account. To this end, the prediction residual signal reconstruction stage 36 comprises a dequantizer 38 which perform the inverse of the quantization of quantizer 30, followed by an inverse transformer 40 which performs the inverse transformation relative to the transformation performed by transformer 32 such as the inverse of the spectral decomposition such as the inverse to any of the above-mentioned specific transformation examples. Encoder 14 comprises an adder 42 which adds the reconstructed prediction residual signal as output by inverse transformer 40 and the prediction signal 24 so as to output a reconstructed signal, i.e. reconstructed samples. This output is fed into a predictor 44 of encoder 14 which then determines the prediction signal 24 based thereon. Predictor 44 supports all the prediction modes already discussed above with respect to FIG. 1. FIG. 2 also illustrates that in case of encoder 14 being a video encoder, encoder 14 may also comprise an in-loop filter 46 with filters completely reconstructed pictures which, after having been filtered, form reference pictures for predictor 44 with respect to inter-predicted block.

As already mentioned above, encoder 14 performs block-based encoding. In certain embodiments, the encoder 14 subdivides picture 10 into blocks for which an intra-prediction mode is selected out of a set or plurality of intra-prediction modes supported by predictor 44 or encoder 14, respectively, and the selected intra-prediction mode performed individually. Other sorts of blocks into which picture 10 is subdivided may, however, exist as well. For instance, the above-mentioned decision whether picture 10 is inter-coded or intra-coded may be done at a granularity or in units of blocks deviating from blocks 18. For instance, the inter/intra mode decision may be performed at a level of coding blocks into which picture 10 is subdivided, and each coding block is subdivided into prediction blocks. Prediction blocks with encoding blocks for which it has been decided that intra-prediction is used, are each subdivided to an intra-prediction mode decision. To this, for each of these prediction blocks, the encoder decides which supported intra-prediction mode should be used for the respective prediction block. These prediction blocks will form blocks 18 which are of interest here. Prediction blocks within coding blocks associated with inter-prediction would be treated differently by predictor 44. They would be inter-predicted from reference pictures by determining a motion vector and copying the prediction signal for this block from a location in the reference picture pointed to by the motion vector. Another block subdivisioning pertains the subdivisioning into transform blocks at units of which the transformations by transformer 32 and inverse transformer 40 are performed. Transformed blocks may, for instance, be the result of further subdivisioning coding blocks. Naturally, the examples set out herein should not be treated as being limiting and other examples exist as well. For the sake of completeness only, it is noted that the subdivisioning into coding blocks may, for instance, use multi-tree subdivisioning, and prediction blocks and/or transform blocks may be obtained by further subdividing coding blocks using multi-tree subdivisioning, as well.

Figure 3:
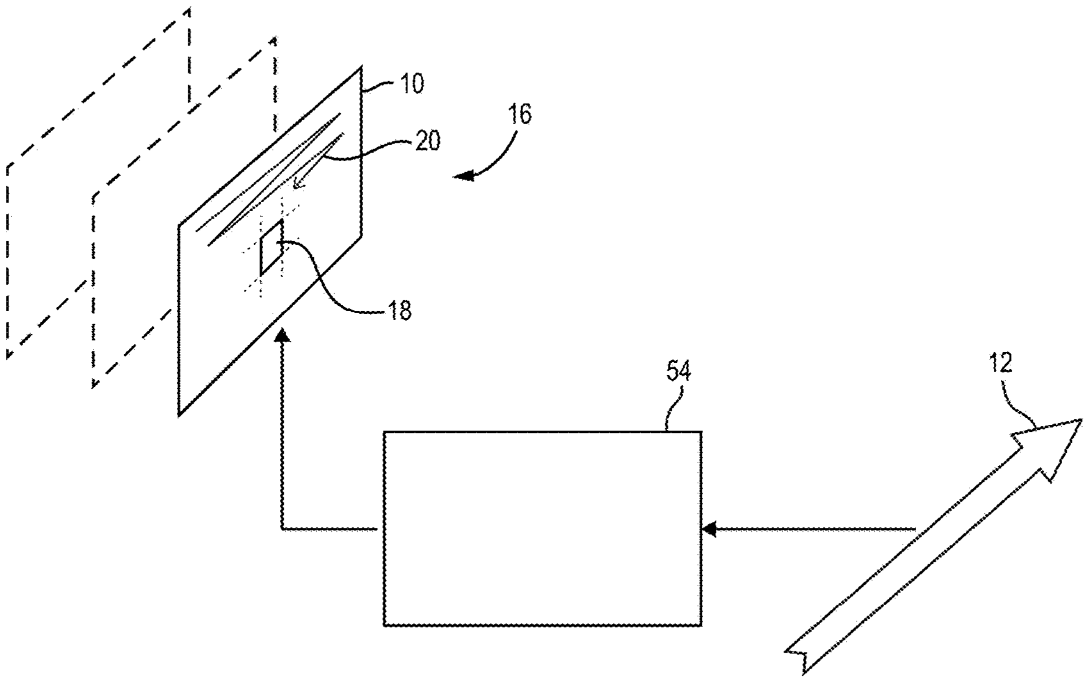
FIG. 3 illustrates an example decoder for decoding a picture or video from a data stream into which embodiments of the present invention may be built in accordance with embodiments of the present disclosure.

A decoder 54 or apparatus for block-wise decoding fitting to the encoder 14 of FIG. 1 is depicted in FIG. 3. This decoder 54 does the opposite of encoder 14. For example the decoder 54 decodes picture 10 in a block-wise manner from data stream 12. The decoder 54 also supports a plurality of intra-prediction modes. The decoder 54 may comprise a residual provider 156, for example. All the other possibilities discussed above with respect to FIG. 1 are valid for the decoder 54, too. To this, decoder 54 may be a still picture decoder or a video decoder and all the prediction modes and prediction possibilities are supported by decoder 54 as well. The difference between encoder 14 and decoder 54 lies, primarily, in the fact that encoder 14 chooses or selects coding decisions according to some optimization such as, for instance, in order to minimize some cost function which may depend on coding rate and/or coding distortion. One of these coding options or coding parameters may involve a selection of the intra-prediction mode to be used for a current block 18 among available or supported intra-prediction modes. The selected intra-prediction mode may then be signaled by encoder 14 for current block 18 within data stream 12 with decoder 54 redoing the selection using this signalization in data stream 12 for block 18. Likewise, the subdivisioning of picture 10 into blocks 18 may be subject to optimization within encoder 14 and corresponding subdivision information may be conveyed within data stream 12 with decoder 54 recovering the subdivision of picture 10 into blocks 18 on the basis of the subdivision information. Summarizing the above, decoder 54 may be a predictive decoder operating on a block-basis and besides intra-prediction modes. Additionally, decoder 54 may support other prediction modes such as inter-prediction modes in case of, for instance, decoder 54 being a video decoder. Decoder 54 may also use the coding order 20 discussed with respect to FIG. 1 and as this coding order 20 is obeyed both at encoder 14 and decoder 54, the same neighboring samples are available for a current block 18 both at encoder 14 and decoder 54. Accordingly, in order to avoid unnecessary repetition, the description of the mode of operation of encoder 14 shall also apply to decoder 54 as far the subdivision of picture 10 into blocks is concerned, for instance, as far as prediction is concerned and as far as the coding of the prediction residual is concerned. Differences lie in the fact that encoder 14 chooses, by optimization, some coding options or coding parameters and signals within, or inserts into, data stream 12 the coding parameters which are then derived from the data stream 12 by decoder 54 so as to redo the prediction, subdivision and so forth.

Figure 4:
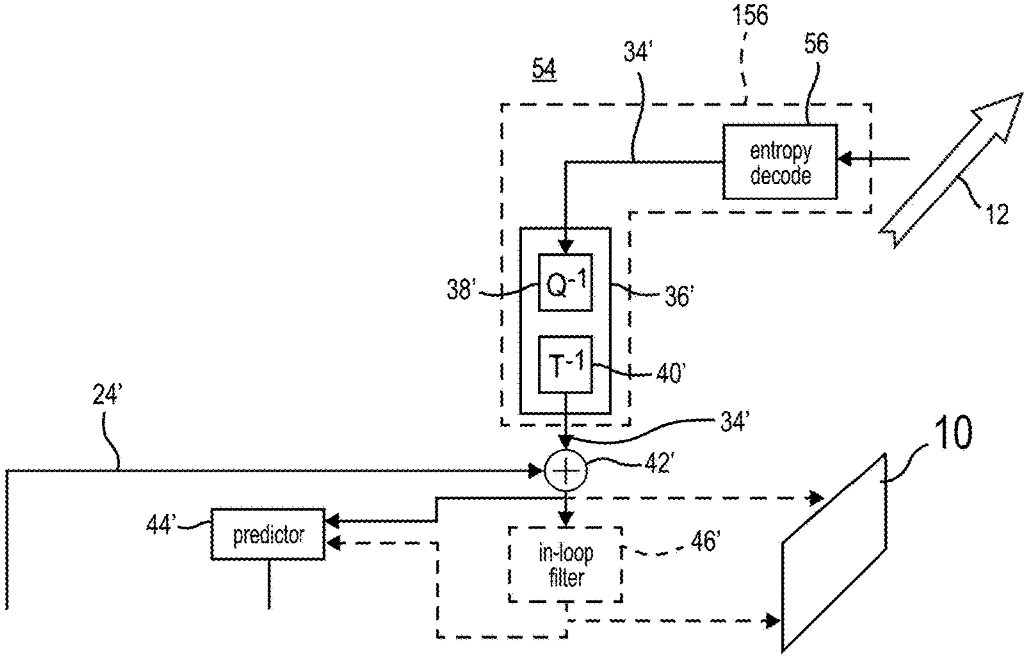
FIG. 4 illustrates a further, more detailed example of a decoder for decoding a picture or video from a data stream into which embodiments of the present invention may be built in accordance with embodiments of the present disclosure.

FIG. 4 shows a possible implementation of the decoder 54 of FIG. 3, namely one fitting to the implementation of encoder 14 of FIG. 1 as shown in FIG. 2. Many elements of the decoder 54 of FIG. 4 are the same as those occurring in the corresponding encoder 14 of FIG. 2. For example, the same or similar reference signs, provided with an apostrophe, are used in FIG. 4 in order to indicate these elements. In particular, adder 42', optional in-loop filter 46' and predictor 44' are connected into a prediction loop in the same manner that they are in encoder of FIG. 2. The process performed by decoder 54 is similar to the encoding side of the encoder 14. For example, entropy decoder 56, inverses the entropy encoding of entropy encoder **28*b*. The prediction residual signal reconstruction stage 36', includes dequantizer 38' and inverse transformer 40' to dequantize and retransform the prediction residual signal, respectively. The dequantized and retransformed prediction residual signal is applied to adder 42' just as it is the case on encoding side. The decoder's output is the reconstruction of picture 10. The reconstruction of picture 10 may be available directly at the output of adder 42' or, alternatively, at the output of in-loop filter 46'. Some post-filter may be arranged at the decoder's output in order to subject the reconstruction of picture 10 to some post-filtering in order to improve the picture quality, but this option is not depicted in FIG. 4**.

Again, with respect to FIG. 4 the description of FIG. 2 shall be similar for FIG. 4 with the exception that the encoder performs the optimization tasks and the associated decisions with respect to coding options. However, all the description with respect to block-subdivisioning, prediction, dequantization and retransforming is also valid for the decoder 54 of FIG. 4.

As said, the above examples are merely illustrative for video codecs, i.e., decoders and encoders, into which the subsequently described embodiments could be built into. A further example is VVC. That is, embodiments of the present application may also result from a modification of the VVC as defined in the current VVC specification so far. This current VVC specification is used in order to describe an embodiment of the present application by way of a modification and motivate the underlying thoughts and advantages. Thereinafter, a broader description of embodiments of the present application is presented. The above-outlined details for possible decoders and encoders into which embodiments of the present application may be built into, may individually or in combination be used in order to specify and further develop the broadened embodiment described herein below.

In the current VVC specification, if a frame is coded in the 4-4-4 color format (sps_chroma_format_idc equal to 3 in the VVC specification) and with the tree type single tree (treeType equal to SINGLE_TREE in the VVC specification), then, in the VVC specification, it is not possible to code a block in the following configuration:

1. The block is coded intra mode
2. The adaptive color transform (ACT) is disabled
3. The luma intra prediction signal is generated using a matrix-based intra prediction (MIP) mode
4. The chroma intra prediction signal is generated using the planar mode This can be seen as follows, where, from now on, it is assumed that sps_chroma_format_idc is equal to 3, that treeType is equal to SINGLE_TREE and that the adaptive color transform is disabled on the given block, i.e cu_act_enabled_flag[xCb][yCb]=0 in section 8.4.3.

According to section 8.4.5.2.1, on the luma component (cIdx equal to 0) of the block, MIP can be used as an intra prediction mode if the MIP-flag for the given block, denoted IntraMipFlagp[xTbCmp][yTbCmp] in that section, is equal to 1.

However, if the MIP-flag for the given block is equal to 1, then, in section 8.4.3, two options are possible. For example, if the MIP-flag for the given block is equal to 1, either the intra chroma mode, denoted intra_chroma_pred_mode in that section, is equal to 4, or intra_chroma_pred_mode is not equal to 4.

If the intra chroma mode of section 8.4.3 (intra chroma pred mode) is equal to 4, then, according to 8.4.3, the Mip chroma direct flag, denoted MipChromaDirectFlag [xCb] [yCb] in that section, is always inferred to be equal to 1. However, in this case, according to section 8.4.5.2.1, for the given block, the intra prediction signal for chroma (cIdx not equal to 0) has to be computed by the MIP-prediction specified in 8.4.5.2.2. Thus, if the intra chroma mode of section 8.4.3 (intra chroma pred mode) is equal to 4, the chroma intra prediction signal cannot be computed using the planar mode. If the intra chroma mode of section 8.4.3 (intra chroma pred mode) is not equal to 4, then, according to 8.4.3, the variable lumaIntraPredMode is set to INTRA_PLANAR=(mode number 0). Consequently, according to Table 20, reproduced below, the chroma intra prediction mode, denoted IntraPredModeC [xCb] [yCb] in 8.4.3, can only be set to 66, 50, 18, 1; or to −81 or to 82 or to 83. Thus, according to section 8.4.5.2.1, the intra prediction signal for chroma (cIdx equal to 1 or 2), is computed by the process specified in section 8.4.5.2.6. Consequently, according to 8.4.5.2.6, for chroma, where the chroma intra prediction mode is denoted by predModeIntra in that section, the chroma intra prediction signal is either computed by the process specified in section 8.4.5.2.14 (for predModeIntra equal to 81 or 82 or 83) or by the process specified in section 8.4.5.2.13 (for predModeIntra equal to 66, 50, 18), or by the process specified in section 8.4.5.2.12 (for predModeIntra equal to 1). In particular, the chroma intra prediction signal is not computed by the planar process (mode number 0), which is specified in 8.4.5.2.11. Thus, if the intra chroma mode of section 8.4.3 (intra chroma pred mode) is not equal to 4, the intra chroma prediction signal it is not generated by the planar mode either. Table 19 and Table 20 of VVC Specification (Version 08/2020) are provided below:

TABLE 19

| Specification of intra prediction mode and associated names | |
|---|---|
| Intra prediction mode | Associated name |
| 0 | INTRA_PLANAR |
| 1 | INTRA_DC |
| 2 . . . 66 | INTRA_ANGULAR2 . . . INTRA_ANGULAR66 |
| 81 . . . 83 | INTRA_LT_CCLM, INTRA_L_CCLM, INTRA_T_CCLM |

During the VVC-standardization process, the design of the standard for the 4-2-0 format was fixed earlier in the process while more specialized applications like the 4-4-4 case were treated later. Thus, it is highly desirable for any VVC modification that, if possible, for the case of the 4-2-0 color format the specification should remain unchanged. This holds particularly true for the intra-mode-derivation process of VVC, which is already quite sophisticated and which, for the 4-2-0 case, was designed carefully by the JVET community. In particular, for the non-4-4-4-single tree case, an important aspect of the VVC-intra-mode derivation is that, for the case that on a given block the luma intra prediction

TABLE 20

Specification of IntraPredModeC[ xCb ][ yCb ] depending on cclm_mode_flag, CCLM mode_idx, intra_chroma_pred_mode and lumaIntraPredMode

| | | | luma_intraPredMode | | | | |
|---|---|---|---|---|---|---|---|
| cclm_mode_flag | cclm_mode_idx | intra_chroma_pred_mode | 0 | 50 | 18 | 1 | X (0 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

However, embodiments of the present disclosure take into consideration that it is desirable to enable the possibility for a combination of MIP on luma and Planar on Chroma for the case of 4-4-4 single tree and no ACT in a way that fits to the structure of the surrounding VVC specification.

As a first observation, and from a signal-processing perspective, in the 4-4-4-single-tree case it is, on the one hand, very desirable to support, for the case that the adaptive color transform is disabled on a given block, the possibility that the luma intra prediction signal is generated by a MIP-mode and that the chroma intra prediction signals are computed by the planar mode, while, on the other hand, it is also very desirable to support the possibility that luma and chroma prediction signals are computed by the same MIP-mode. The reason for this observation is that both MIP and planar modes target rather smooth content and that, for typical content, the luma and the chroma signals of a block reveal some correlation. However, depending on the content, this correlation might either reach the degree that one can assume that both signals are rather smooth, in which case it might be highly beneficial to allow MIP in the luma component but planar in the chroma component, or it might be so strong that it is preferable that luma and chroma use exactly the same intra prediction mode. Consequently, following the general principle of hybrid video coding which tries to support efficient coding options for all statistically significant cases, it is very desirable to support both combinations of luma and chroma prediction generation in the 4-4-4-single-tree case. However, it is noted that, by the very design of the adaptive color transform, the first combination, the usage of a MIP mode in the luma, but of the planar mode in the chroma components, is not suitable in the case that the adaptive color transform is enabled.

As a second observation, is it noted that the VVC specification is finalized already for some time and multiple companies worldwide already work on implementing it on devices, in particular for the case of a 4-2-0 color format. signal is computed using a MIP-mode, the direct mode (intra_chroma_pred_mode equal to 4 in section 8.4.3) always implies that the chroma intra prediction signals are computed using a planar mode. This is due to the fact that for non-4-4-4-single-tree cases, there is no appropriate way to interpret a MIP-mode on the luma block also as a MIP-mode on the chroma block, in particular since MIP-modes are defined depending on the shape (or size), where, for the non-4-4-4-single-tree case, the shape of the luma and of the chroma components of a given block might be different. Here, the planar mode is a reasonable candidate to be used in chroma when MIP is used in luma since both MIP modes and the planar mode tend to be more efficient for rather smooth content.

However, if it is the case that for chroma, the planar intra prediction signal can be generated by using the direct mode, in order to avoid redundancy, it is desirable that the planar mode can be signaled via the direct-mode option and not by any other option. Hence, in Table 20 of section 8.4.3 of the specification, the planar mode should occur once in each column. For this reason, in Table 20 of the current specification, the planar mode has to be removed from the row corresponding to intra_chroma_pred_mode=0 whenever its usage as a chroma intra prediction mode can be signaled via the direct mode, i.e. via setting intra_chroma_pred_mode=4.

Despite the highly sophisticated process of mode-derivation in the VVC-specification, which is partially outlined above, the embodiments of the present disclosure describe a modification of the VVC specification that alters the specific MIP-Planar combinations between luma and chroma for the case of a 4-4-4-single-tree-non-ACT block, but keeps the functionality of the specification unmodified in all other cases. However, in order to extend the capabilities of the VVC standard towards the possibility of enabling the combination of MIP on the luma and planar on the chroma component of a block in the 4-4-4 single-tree-non-ACT case while, at the same time, suggesting very limited modifications of the VVC specification that in particular do not alter the whole design for the non-4-4-4-single-tree-non-ACT case, which is described in various embodiments of the present application.

It is suggested to introduce a specific new value for the luma intra prediction mode. This value is chosen such that all the aforementioned aspects can be kept, i.e. the specification, in particular the intra-mode derivation, is kept unchanged for all cases that are not 4-4-4-no-ACT. Thus, on the one hand, in the case that one does not have single-tree-4-4-4, in the present embodiment, Table 20 is designed such that the direct mode is always the planar mode in the case that a MIP mode is used to compute the luma intra prediction signal and consequently, for this case, the planar mode does not occur in the row corresponding to intra_chroma_pred_mode=0 (since it is already present in the row corresponding to intra_chroma_pred_mode=4). On the other hand, for the case of 4-4-4-single-tree, by the method suggested in the present disclosure, Table 20 is designed such that the planar mode is assigned to the row corresponding to intra_chroma_pred_mode=0 in the case that a MIP mode is used to compute the luma intra prediction signal.

As a concrete example, all above-mentioned goals are achieved by the following modification of section 8.4.3 of the VVC specification, highlighted by underlining.

8.4.3 Derivation Process for Chroma Intra Prediction Mode

Input to this process are:
- a luma location (xCb, yCb) specifying the top-left sample of the current chroma coding block relative to the top-left luma sample of the current picture,
- a variable cbWidth specifying the width of the current coding block in luma samples,
- a variable cbHeight specifying the height of the current coding block in luma samples,
- a variable treeType specifying whether a single or a dual tree is used.

In this process, the chroma intra prediction mode IntraPredModeC[xCb][yCb] and the MIP chroma direct mode flag MipChromaDirectFlag[xCb][yCb] are derived.

The variable isSingleTreeAnd444 is derived as follows:

The MIP chroma direct mode flag MipChromaDirectFlag[xCb][yCb] is derived as follows:

If all of the following conditions are true, MipChromaDirectFlag[xCb][yCb] is set equal to 1:
- treeType is equal to SINGLE_TREE.
- sps_chroma_format_idc is equal to 3.
- intra_chroma_pred_mode is equal to 4 or cu_act_enabled_flag[xCb][yCb] is equal to 1.
- IntraMipFlag[xCb][yCb] is equal to 1.

Otherwise, MipChromaDirectFlag[xCb][yCb] is set equal to 0.

The chroma intra prediction mode IntraPredModeC[xCb][yCb] is derived as follows:

If MipChromaDirectFlag[xCb][yCb] is equal to 1, the chroma intra prediction mode IntraPredModeC[xCb][yCb] is set equal to IntraPredMode Y[xCb][yCb].

Otherwise, the following applies:

The corresponding luma intra prediction mode lumaIntraPredMode is derived as follows:

If IntraMipFlag[xCb+cbWidth/2][yCb+cbHeight/2] is equal to 1, the following applies:

If treeType is equal to SINGLE TREE and sps chroma format idc is equal to 3, lumaIntraPredMode is set equal to −1.

Otherwise, lumaIntraPredMode is set equal to INTRA_PLANAR.

Otherwise, if CuPredMode[0][xCb+cbWidth/2][yCb+cbHeight/2] is equal to MODE_IBC or MODE_PLT, lumaIntraPredMode is set equal to INTRA_DC.

Otherwise, lumaIntraPredMode is set equal to

IntraPredModeY[xCb+cbWidth/2][yCb+cbHeight/2].

The chroma intra prediction mode IntraPredModeC[xCb][yCb] is derived as follows:

If cu_act_enabled_flag[xCb][yCb] is equal to 1, the chroma intra prediction mode IntraPredModeC[xCb][yCb] is set equal to lumaIntraPredMode.

Otherwise, if BdpcmFlag[xCb][yCb] [1] is equal to 1, IntraPredModeC[xCb][yCb] is set equal to BdpcmDir[xCb][yCb][1]? INTRA_ANGULAR50: INTRA_ANGULAR18.

Otherwise (cu_act_enabled_flag[xCb][yCb] is equal to 0 and BdpcmFlag[xCb][yCb][1] is equal to 0), the chroma intra prediction mode IntraPredModeC[xCb][yCb] is derived using cclm_mode_flag, cclm_mode_idx, intra_chroma_pred_mode and lumaIntraPredMode as specified in Table 20.

TABLE 20

Specification of IntraPredModeC[ xCb ][ yCb ] depending on cclm_mode_flag, cclm_mode_idx, intra_chroma_pred_mode and lumaIntraPredMode

| | | | lumaIntraPredMode | | | | |
|---|---|---|---|---|---|---|---|
| cclm_mode_flag | cclm_mode_idx | intra_chroma_pred_mode | 0 | 50 | 18 | 1 | X (−1 <= X <= 66) |
| 0 | — | 0 | 66 | 0 | 0 | 0 | 0 |
| 0 | — | 1 | 50 | 66 | 50 | 50 | 50 |
| 0 | — | 2 | 18 | 18 | 66 | 18 | 18 |
| 0 | — | 3 | 1 | 1 | 1 | 66 | 1 |
| 0 | — | 4 | 0 | 50 | 18 | 1 | X |
| 1 | 0 | — | 81 | 81 | 81 | 81 | 81 |
| 1 | 1 | — | 82 | 82 | 82 | 82 | 82 |
| 1 | 2 | — | 83 | 83 | 83 | 83 | 83 |

When sps_chroma_format_idc is equal to 2, the chroma intra prediction mode Y is derived using the chroma intra prediction mode X in Table 20 as specified in Table 21, and the chroma intra prediction mode X is set equal to the chroma intra prediction mode Y afterwards.

TABLE 21

Specification of the 4:2:2 mapping process from chroma intra prediction mode X to mode Y when sps_chroma_format_idc is equal to 2

| | | | | | | | | | | | | | | | | | | |
|---|---|---|---|---|---|---|---|---|---|---|---|---|---|---|---|---|---|---|
| mode X | 0 | 1 | 2 | 3 | 4 | 5 | 6 | 7 | 8 | 9 | 10 | 11 | 12 | 13 | 14 | 15 | 16 | 17 |
| mode Y | 0 | 1 | 61 | 62 | 63 | 64 | 65 | 66 | 2 | 3 | 5 | 6 | 8 | 10 | 12 | 13 | 14 | 16 |
| mode X | 18 | 19 | 20 | 21 | 22 | 23 | 24 | 25 | 26 | 27 | 28 | 29 | 30 | 31 | 32 | 33 | 34 | 35 |
| mode Y | 18 | 20 | 22 | 23 | 24 | 26 | 28 | 30 | 31 | 33 | 34 | 35 | 36 | 37 | 38 | 39 | 40 | 41 |
| mode X | 36 | 37 | 38 | 39 | 40 | 41 | 42 | 43 | 44 | 45 | 46 | 47 | 48 | 49 | 50 | 51 | 52 | 53 |
| mode Y | 41 | 42 | 43 | 43 | 44 | 44 | 45 | 45 | 46 | 47 | 48 | 48 | 49 | 49 | 50 | 51 | 51 | 52 |
| mode X | 54 | 55 | 56 | 57 | 58 | 59 | 60 | 61 | 62 | 63 | 64 | 65 | 66 | | | | | |
| mode Y | 52 | 53 | 54 | 55 | 55 | 56 | 56 | 57 | 57 | 58 | 59 | 59 | 60 | | | | | |

Embodiments of the present disclosure will now describe how the proposed modification solves the identified problem and meets all described design-criteria.

First, the presented solution does not alter anything for the cases which are not 4-4-4-single-tree case. Namely, in these cases, lumaIntraPredMode cannot be set to −1 since the conditions that sps_chroma_format_idc is equal to 3 and that treeType is equal to SINGLE_TREE cannot both be true. Thus, the solution does not modify the outcome of Table 20 and of the whole section 8.4.3 in this case.

Second, the modified specification now supports that, in the 4-4-4-single-tree-no-ACT case, for a given block, the luma intra prediction signal is generated using a MIP mode while the chroma intra prediction signals are generated using the planar mode. Namely, in the case 4-4-4-single-tree-no-ACT, if in the above modified version of section 8.4.3, the luma intra prediction signal is generated using a MIP-mode, i.e. if IntraMipFlag[xCb+cbWidth/2][yCb+cbHeight/2] is equal to 1, then, by the above modification, lumaIntraPredMode is set equal to −1. Consequently, according to the above modified Table 20, if intra_chroma_pred_mod is equal to 0, then the chroma intra mode IntraPredModeC [xCb][yCb] is set equal to 0, which corresponds to the planar mode. Moreover, since in 8.4.3, intra_chroma_pred_mod is equal to 0, the MIP direct mode flag, denoted MipChromaDirectFlag[xCb][yCb] in that section, is set equal to 0. Consequently, according to section 8.4.5.2.1, for chroma (cIdx not equal to zero), the chroma intra prediction signal is computed by the process specified in section 8.4.5.2.6, where predModeIntra equals IntraPredModeC[xCb][yCb] =0=INTRA_PLANAR. Moreover, according to section 8.4.5.2.6 this implies that the chroma intra prediction signal is computed by the process specified in section 8.4.5.2.11, i.e. the chroma intra prediction signal is computed using the planar mode.

Third, the modified specification also supports that, in the 4-4-4-single-tree case, for a given block, the luma intra prediction signal is generated using a MIP mode and the chroma intra prediction signals are computed using the same MIP mode. Namely, if in the 4-4-4-single-tree case, in the above modified version of section 8.4.3, the luma intra prediction signal is generated using a MIP-mode, i.e. if IntraMipFlag[xCb+cbWidth/2][yCb+cbHeight/2] is equal to 1 and if intra_chroma_pred_mod is equal to 4 or if the adaptive color transform is enabled, then, the MIP direct mode flag, denoted MipChromaDirectFlag[xCb][yCb] in that section, is set equal to 1. Consequently, in section 8.4.3, IntraPredModeC[xCb][yCb] is set equal to IntraPredMode Y[xCb][yCb], which is the MIP mode used for luma. Moreover, in section 8.4.5.2.1, the intra prediction signals for chroma (cIdx not equal to zero) are computed by the MIP-prediction specified in 8.4.5.2.2, since MipChromaDirectFlag[xTbCmp][yTbCmp] is equal to 1. Here, the MIP-mode IntraPredModeC[xCb][yCb] is used, which equals the MIP mode IntraPredMode Y[xCb][yCb] used for luma.

Now that a certain embodiment of the present application has been outlined and presented as a modification of the current VVC specification along with a presentation of the associated advantages thereof, the description of the present application proceeds with broadened embodiments which are not necessarily restricted to an implementation according to VVC. Again, for the subsequently explained embodiments, it is naturally possibly to extend same by individual or combined details of the description brought forward above, i.e. those brought forward with respect to FIGS. 1-4 as well as those brought forward with respect to VVC.

Figure 5:
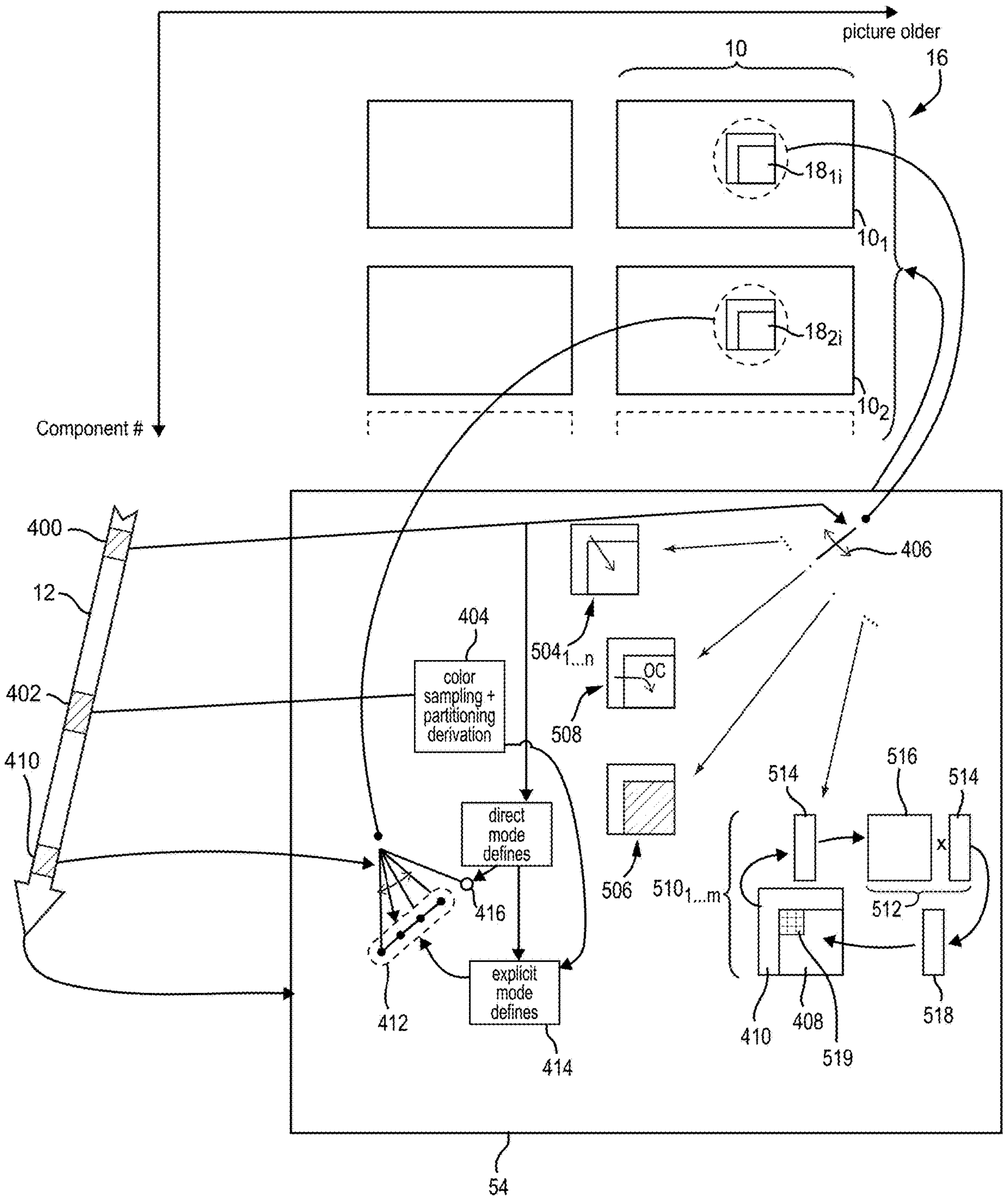
FIG. 5 illustrates schematic diagram of a decoder according to an embodiment, where each of decoders of FIGS. 3 and 4 may serve as an implementation example in accordance with embodiments of the present disclosure.

Reference is made to FIG. 5 which shows a block-based decoder for decoding a picture 10 of more than one color component 101 and 102 from a data stream 12. It should be noted that the block-based decoder does not necessarily represent a video decoder, but could also be a still picture decoder. That is, while picture 10 is illustrated as being part of a video 16, this needs not be the case. Moreover, the following description focuses on two color components 101 and 102, but the picture 10 (of the pictures of video 16) might be de-composed into more than two color components in which case, for instance, subsequent color components such as the third color component might be treated in the same way as described with respect to the second color component in the following.

The block-based decoder 54 of FIG. 5 is indicated by re-using reference sign 54. Again, all details described above with respect to FIGS. 3 and 4 may individually or in combination be used in order to form further embodiments out of the embodiment presented now with respect to FIG. 5.

Figure 6:
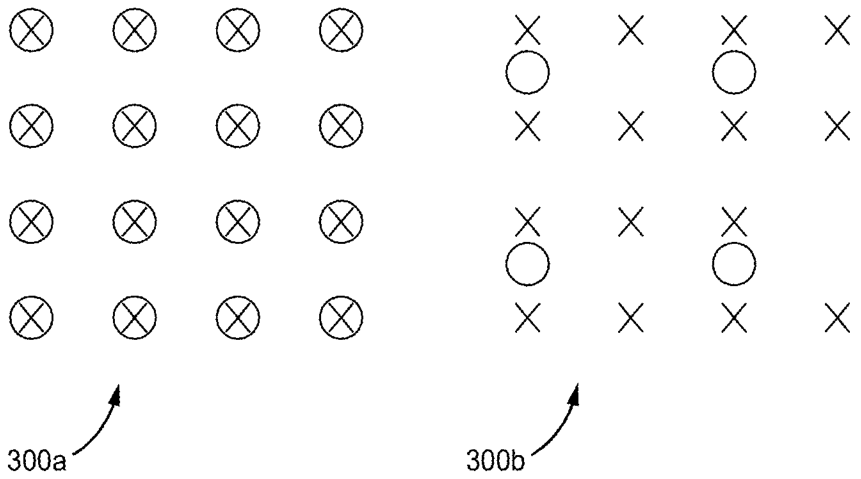
FIG. 6 illustrates a schematic diagram of an example for different color sampling formats which may be supported be the decoder of FIG. 5 in accordance with embodiments of the present disclosure.

The decoder 54 of FIG. 5 is able to deal with different color sampling formats in partitioning schemes. To illustrate this, reference is made to FIG. 6 and FIG. 7. FIG. 6 shows two examples for sampling format types 300*a* and 300*b*. According to sampling format type 300*a* a common sampling pattern is used for all color components. For instance, in FIG. 6, the crosses shall indicate sample positions of the first color component, while circles shall indicate sample positions of the second (and possible further) color components, and as can be seen, the sample positions of the second color component overlay and coincide with the sample positions of the first color component. The situation is different in case of color sampling format type 300*b*. In that case, different sampling patterns are used for the first color component and the second color component, respectively. In particular, in case of color sampling format type 300*b*, the picture is sampled at a higher resolution with respect to the first color component when compared to the second color component. The color sampling format type 300*b* may be denoted 4:2:0 while 300*a* may be denoted 4:4:4. The color sampling format types shown in FIG. 6 are merely illustrative and it might be that decoder 54 is able to deal with more color sampling format types or color sampling format types including sampling format type 300*a* and one or more other types including or excluding type 300*b*. That is, decoder 54 shall be able to support sampling format type 300*a* and at least one or more further ones.

Figure 7:
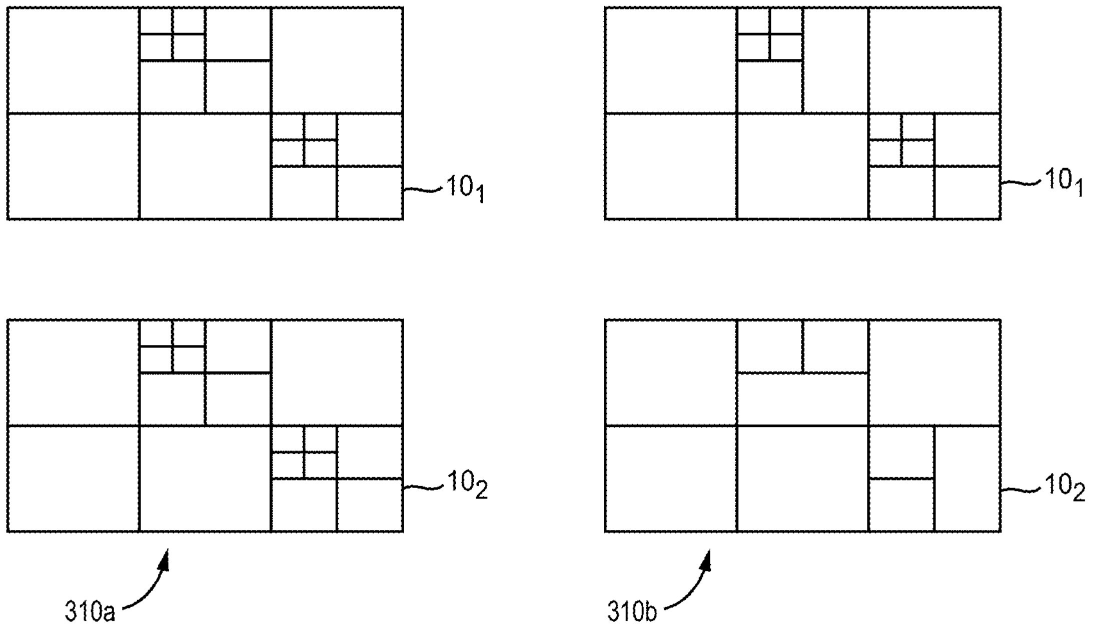
FIG. 7 illustrates a schematic diagram of an example for different partitioning schemes which may be supported by the decoder of FIG. 5 in accordance with embodiments of the present disclosure.

FIG. 7 shows two different partitioning scheme types 310*a* and 310*b* supported by the block-based decoder 54. According to the first one 310*a*, the color components 101 and 102 are coded into data stream 12 using a common block-partitioning. That is, if that block partitioning scheme type 310*a* is active or signaled to be used in data stream 12, then the block-based decoder 54 decodes common block partitioning information from data stream 12 and equally partitions the picture into first color component blocks and second color component blocks, respectively, so that the first and second color component blocks spatially coincide as illustratively shown in FIG. 7. In particular, FIG. 7 illustrates the partitioning by use of a partitioning concept according to which the picture is firstly partitioned into tree root blocks each of which is subjected to a recursive multi-tree partitioning, but the embodiments of the present application are not restricted to any type of specific partitioning concept.

Other than partitioning scheme type 310*a*, the partitioning scheme type 310*b* decouples the partitioning of picture 10 into first color component blocks on the one hand and the partitioning of picture 10 into a second color component blocks on the other hand. To be more precise, according to partitioning scheme type 310*b*, the decoder decodes from data stream 12 first color component partitioning information for defining the partitioning of picture 10 into first color component blocks, and second color partitioning information for partitioning picture 10 into second color component blocks. The partitioning of the second color component into the second color component blocks may be defined by the second color component partitioning information uniquely or in a manner depending on the first color component partitioning information. In any case, as can be seen, the partitioning scheme type 310*b* causes that there might be, and in FIG. 7 actually are, second color component blocks which overlay one or more first color component blocks in a manner so that its borders cross the block inner of the overlayed first color component blocks and/or the borders of the overlayed first color component blocks cross the block inner of the second color component block, respectively. This is different from partitioning scheme type 310*a* where each first color component block has associated therewith a co-located second color component block of equal size and position so that their borders coincide, and, vice versa, each second color component block has associated therewith a co-located first color component block of equal size and position so that their borders coincide.

The aforementioned first and second color component blocks may from the block level at which decoder and encoder perform the selection among intra coding and inter coding, i.e. intra-prediction and inter-prediction. In case of the partitioning scheme type 310*a*, for instance, it might be that the selection is done commonly for co-located first and second color component blocks, i.e., so that each second color component block is intra-predicted if the co-located first component block is intra-predicted as well, and is inter-predicted if it is co-located first component block is inter-predicted as well.

As decoder 54 supports different color sampling formats and different partitioning schemes, the block-based decoder 54 derives 404 the color sampling format to be used for picture 10 and the partitioning scheme to be used for picture 10 from one or more first syntax elements 402 in data stream 12.

The description of the functionality of decoder 54 concentrates, from now on, onto the mode of operation with respect to intra-predicted blocks. In principle, however, and as it got clear from the indications above pointing to FIGS. 1-4, the decoder 54 may also be, optionally, able to handle inter-predicted blocks.

Decoder 54 decodes the first color component 101 of picture 10 in the block-wise manner and, in doing so, selects 406, for each of intra-predicted first color component blocks of picture 10, one out of several intra-prediction modes. FIG. 5 shows, illustratively, one such intra-predicted first color component block 181*i* but, as said, this may naturally not be the only one in picture 10.

According to the embodiment of FIG. 5, the block-based decoder 54 offers different intra-prediction modes to the inter-predicted first color component block 181*i*, namely several directional modes $\mathbf{504}_{1 \ldots n}$ a planar mode 506, a DC mode 508 and several matrix-based intra-prediction modes $\mathbf{504}_{1 \ldots m}$. The DC mode 508 is may be the easiest one: based on one or more reference samples in an already decoded neighborhood 410, one sample value is determined and used as the predicted sample value for each sample in the block inner 408 of the intra-predicted block. That is, in case of the DC mode, the predicted sample values in the block inner will be all the same so that this mode is called DC mode. In case of the planar mode 506, the reference samples in the neighborhood 410 are used to predict the sample values in the block inner in such a manner that the predicted sample values assigned to sample values in the block inner linearly vary both in vertical direction as well as horizontal direction. That is, the reference samples are used to define a horizontal slope, a vertical slope and an offset and the predicted sample values and the block inner are defined using these three parameters. The predicted sample values, thus, form a plane, thereby leading to the name planar mode.

The directional modes $\mathbf{504}_{1 \ldots n}$ mutually differ in the definition of an angle or direction along which the picture content defined in the already decoded neighborhood 410 is copied into, or extrapolated into, the block inner. To this end, some interpolation may be used in order to define sub-sample positions between the reference samples and choosing for each sample in the block inner that sample or sub-sample position in the neighborhood which hits the respective sample position in the block inner when using the angle or direction of the corresponding directional mode for aiming. The chosen sample/sub-sample's sample value is then used or copied as predicted sample value. In other words, the neighborhood's content is copied into, alongside the mode's direction, into the block inner.

In case of matrix-based intra-prediction modes $\mathbf{510}_{1 \ldots m}$, the block inner 408 is predicted by deriving a sample value vector 514 out of the reference samples of the already decoded neighborhood 410, neighboring the block inner 408, computing a matrix-vector product 512 between the sample value vector 414 and a prediction matrix 516 which is associated with a respective matrix-based inter-prediction mode so as to obtain a prediction vector 518 and predicting samples 519 in the block inner 408 on the basis of this prediction vector 518.

Note that, theoretically, each of the other modes $\mathbf{504}_{1 \ldots n}$ to 508 could, theoretically, be implemented using a matrix-vector product, but each prediction matrix 516 associated with the matrix-based intra-prediction modes are the result of machine learning and while same might be integer valued, they tend to be irregular other than matrices would which would emulate any of modes $\mathbf{504}_{1 \ldots n}$ to 508. In even other words, the matrix-based intra-prediction modes have no real semantic meaning with respect to the way the block inner 408 is predicted based on the neighborhood 410, other than the other intra-prediction modes 504 to 508. The latter statement is also interesting when inspecting different block sizes. As already noted above, all partitioning schemes lead to picture 10 being partitioned into blocks of different sizes with respect to both color components with this leading, in turn, also to intra-predicted blocks of different sizes again with respect to the first and second color component, respectively. In order to account for intra-predicted blocks of different sizes, decoder 54 selects the prediction matrices associated with the matrix-based intra-prediction modes depending on a size of the block inner 408 of the block to be intra predicted. In other words, the block-based decoder 54 manages for each possible block size or for each of several block size ranges, a different set of prediction matrices associated with the matrix-based intra-prediction modes. Since these prediction matrices are, however, the result of machine learning, the prediction matrices associated with the matrix-based intra-prediction modes for one block size are not semantically comparable with the different set of prediction matrices associated with the matrix-based intra-prediction modes for a different block size.

The latter statement leads us to the main topic of the block-based decoder 54, namely the question how to effectively determine the intra-prediction mode to be used for a predetermined second color component block 182*i* with respect to which block 181*i* forms a co-located intra-predicted first color component block. Again, the block-based decoder 54 selects one out of the available intra-prediction modes for the intra-predicted first color component block 181*i* such as by use of one or more syntax elements 400 in data stream 12. For instance, the selection may be guided by one syntax element selecting one out of the set of available matrix-based intra-prediction modes 506 to 510*m*, or by a set of syntax elements among which, for instance, one or two may indicate whether the intra-prediction mode for the intra-predictive first component block 181*i* is to be selected out of a list of most probable prediction modes construed on the basis of intra-prediction modes used for neighboring intra-predicted first component blocks, neighboring in spatial and/or temporal terms, and, if yes, which one of this list of most probable intra-prediction modes, and if not, a further syntax element specifying the intra-prediction mode to be used for the intra-predicted first component block 181*i* out of the remaining available intra-prediction modes, excluded from the list of most probable prediction modes. Other possibilities exist as well and the explicit examples shall not be treated as exclusive.

In decoding the second color component 102 of picture 10 in a block-wise manner, decoder 54 decodes, for the second color component block 182*i*, a second color-component intra-prediction mode syntax element 403 from data stream 12. The syntax element 403 has a comparatively reduced set of available states and may index one out of a set 412 of explicit intra-prediction modes $\mathbf{412}_{1 \ldots p}$, and a special direct mode or inter-component mode induction mode 416. Note that, alternatively, the decoder may determine the intra-prediction mode index from the data stream implicitly, i.e. not through explicit signaling using intra-prediction mode syntax element 403, but by an inference based on other information contained in the data stream such as by way of inspecting whether the data stream indicates that for the block 182*i* ACT applies or not.

That is, decoder is capable of applying each of modes $\mathbf{504}_1$ to $\mathbf{510}_m$ onto both first-component intra-prediction blocks and second-component intra-prediction blocks with the block inner 108 relating to the block to be predicted and the neighborhood relating to first component samples in case of the block inner being the block inner of a first-component intra-prediction block, and relating to second component samples in case of the block inner being the block inner of a second-component intra-prediction block. That is, the intra-prediction modes operate, with respect to the sample prediction, intra-color-component wise. However, merely a reduced set out of these modes is available/signalable for a certain block 182*i*, as described below.

Both, the set 412 as well as the direct mode 416 are determined or populated or recruited in a manner depending on the intra-prediction mode having been selected for the co-located first component intra-prediction block 181*i*. Together, the intra-prediction modes $\mathbf{412}_{1 \ldots p}$ of set 412 and mode 416 form a reduced set of list out of which a selection is made by way of index such as the index represented by syntax element 403. The modes of the list 412+416 are, as said, recruited, i.e. are selected out of, the larger set of all available modes $\mathbf{504}_1$ to $\mathbf{510}_m$ according to certain rules outlined in more detail below. These rules follow the thoughts outlined above and also outlined below. This results into a very effective signaling of the intra-prediction mode to be used for block 182*i* as, firstly, the intra-prediction mode syntax element 403 has a reduced set of available states to make a selection there among, and these states or modes 412+416 are filled or defined by decoder and encoder in an efficient manner so that this reduced set of states or modes 412+416 most likely result into a selectable set of modes for block 182*i*, which comprises the mode out of all modes which fits best or results in the best coding compression for block 182*i* even when considering the other modes which had been available for block 181*i*, which are, however, not included among the available states or modes 412+416 for block 182*i*.

In particular, if the intra-prediction mode index indexes one of the set 412 of explicit intra-prediction modes, the decoder forms the set of explicit intra-prediction modes in a manner distinguishing between several cases namely ones, where the color sampling format defines the common sampling format type 300*a* and the partitioning scheme defines the common block-partitioning according to 310*a*, and ones where this is not the case. The reason for treating the case where the common sampling format type 300*a* and the common block-partitioning according to 310*a* apply, as a specific situation is that, in this situation, the intra-predicted second component block 182*i* as well as the co-located intra-predicted first component block 181*i* are of equal size and shape and accordingly, if a matrix-based intra-prediction mode has been selected for block 181*i*, this mode is also meaningful for block 182*i*. If, however, this color sampling format and prediction scheme situation does not apply, it is not clear whether a matrix-based prediction mode possibly elected for block 181*i*, i.e. one having a certain index, would also be suitable for block 182*i*, as the blocks might be, or are definitely, of different size/shape and accordingly, the concordance between the matrix-based intra-prediction modes might not be given. Accordingly, the decoder uses a selected matrix-based prediction mode for block 181*i* as the direct mode 416 merely in case of this common sampling format type 300*a* and common block-partitioning 310*a* and uses the planar mode 506 as a substitute for direct mode 416 otherwise. This, in turn, means that the planar mode is not available by way of direct mode 416 in case of the common sampling format type 300*a* and the common block-partitioning 310*a* applying, so that in the latter case, the set 412 of explicit modes is formed in a manner so that the planar mode is included in this set in case of the common sampling format type 300*a* and the common block-partitioning 310*a* applying.

The exact way of forming set 412 and defining direct mode 416 are defined in the claims. The encoder performs the same predictions, but selects the intra-prediction modes wherever the selection is free, for blocks 181*i* and 182*i* such as in rate-distortion optimization sense.

In particular, for defining the direct mode 416, the following applies:

If the color sampling format defines the common sampling format type 300a and the partitioning scheme defines the common block-partitioning 310*a*, and if one of the matrix-based intra-prediction modes $\mathbf{510}_1$ to $\mathbf{510}_m$ is selected for the co-located intra-predicted first-color-component block 18*a*1, the one of the matrix-based intra-prediction modes $\mathbf{510}_1$ to $\mathbf{510}_m$ which is selected for the co-located intra-predicted first-color-component block 18*a*1 is used as direct mode, as there is no block size/shape gap between first and second component blocks 181*i* and 182*i* and, thus, the same mode may reasonably be used.

If this situation does not apply (i.e. if the color sampling format does not define the common sampling format type 300*a* or the partitioning scheme does not define the common block-partitioning 310*a*) and if any of the matrix-based intra-prediction modes 5101 to 510*m* is selected for the co-located intra-predicted first-color-component block 18*a*1, then the planar mode is used as direct mode 416.

If any of the planar, DC or the directional modes is selected for the co-located intra-predicted first-color-component block 18*a*1, then the intra-prediction mode selected for the co-located intra-predicted first-color-component block 18*a*1 is used as direct mode 416 irrespective of whether the special situation of 300*a* and 310*a* applies are not.

Set 412 is formed so that the planar mode is available for block 182*i*. For example, if the color sampling format defines the common sampling format type 300*a* and the partitioning scheme defines the common block-partitioning according to 310*a*, and if any of the matrix-based intra-prediction modes 5101 to 510*m* is selected for a co-located intra-predicted first-color-component block 18*a*1, for one of the set 412 of explicit intra-prediction modes the planar mode is used, since in that case the direct mode 416 is represented by one of the matrix-based modes, while the remaining modes of set 412 are recruited from the directional modes and the DC mode.

For another example, if the DC mode or any of the directional modes is selected for the co-located intra-predicted first-color-component block 18*a*1, for one of the set 412 of explicit intra-prediction modes the planar mode is used, while the remaining modes of set 412 are recruited from the directional modes and the DC mode.

For yet another example, if the planar mode is selected for the co-located intra-predicted first-color-component block 18*a*1, the set of explicit intra-prediction modes is recruited from directional modes and the DC mode and excludes the planar mode.

Additionally, for yet another example, if the color sampling format does not define the common sampling format type 300*a* or the partitioning scheme does not define that the more than one color component are coded into the data stream using the common block-partitioning according to 310*a*, and if one of the matrix-based intra-prediction modes 5101 to 510*m* is selected for a co-located intra-predicted first-color-component block 18*a*1, the set of explicit intra-prediction modes is recruited from directional modes and excludes the planar mode, since in that case, the planar mode is used as the direct mode as a substitute for the matrix based mode of block 181*i* due to the difference in size/shape.

In recruiting set 412, it might be that the planar mode, if to be included into set 412, is most preferred, followed by the DC mode, unless same is used as direct mode 416, followed by a predetermined sequence of decreasingly preferred directional modes among which any is left-off if, by accident, being used as the direct mode.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system. None of the description in this application should be read as implying that any particular element, step, or function is an essential element that must be included in the claims scope.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A decoder for decoding a picture, the decoder configured to:

determine that matrix based intra prediction (MIP) mode is used to predict a block of a first color component of the picture;

decode a first value representing intra prediction mode for a block of a second color component of the picture;

determine a second value based on a partitioning tree type and an integer relating a sampling of the block of the second color component relative to a sampling of the block of the first color component, wherein the second value is determined to equal −1;

determine to use a planar intra prediction mode to predict the block of the second color component, based on the first value and the second value; and predict the block of the first color component using the MIP mode and the block of the second color component using the planar intra prediction mode.

2. The decoder of claim 1, wherein the decoder is configured to:

determine, based on the integer, that the block of the first color component and the block of the second color component are related using 4-4-4 sampling.

3. The decoder of claim 1, wherein:
the first color component is a luma component,
the second color component is a chroma component, and the partitioning tree type is single tree.

4. The decoder of claim 1, wherein the decoder is configured to:
use the first value and the second value as input parameters for a lookup table; and
determine to use the planar intra prediction mode to predict the block of the second color component using the input parameters with the lookup table.

5. The decoder of claim 1, wherein the decoder is configured to:
derive a value for a Mip chroma direct flag; and
in response to a determination that the value of the Mip chroma direct flag is zero, determine to use the planar intra prediction mode to predict the block of the second color component.

6. A method for decoding a picture, the method comprising:
determining that matrix based intra prediction (MIP) mode is used to predict a block of a first color component of the picture;
decoding a first value representing intra prediction mode for a block of a second color component of the picture;
determining a second value based on a partitioning tree type and an integer relating a sampling of the block of the second color component relative to a sampling of the block of the first color component, wherein the second value is determined to equal −1;
determining to use a planar intra prediction mode to predict the block of the second color component, based on the first value and the second value; and
predicting the block of the first color component using the MIP mode and the block of the second color component using the planar intra prediction mode.

7. The method of claim 6, further comprising:
determining, based on the integer, that the block of the first color component and the block of the second color component are related using 4-4-4 sampling.

8. The method of claim 6, wherein:
the first color component is a luma component,
the second color component is a chroma component, and the partitioning tree type is single tree.

9. The method of claim 6, further comprising:
using the first value and the second value as input parameters for a lookup table; and
determining to use the planar intra prediction mode to predict the block of the second color component using the input parameters with the lookup table.

10. The method of claim 6, further comprising:
deriving a value for a Mip chroma direct flag; and
in response to determining that the value of the Mip chroma direct flag is zero, determining to use the planar intra prediction mode to predict the block of the second color component.

11. A non-transitory computer readable medium containing instructions that when executed cause at least one processor to:
determine that matrix based intra prediction (MIP) mode is used to predict a block of a first color component of a picture;
decode a first value representing intra prediction mode for a block of a second color component of the picture;
determine a second value based on a partitioning tree type and an integer relating a sampling of the block of the second color component relative to a sampling of the block of the first color component, wherein the second value is determined to equal −1;
determine to use a planar intra prediction mode to predict the block of the second color component, based on the first value and the second value; and
predict the block of the first color component using the MIP mode and the block of the second color component using the planar intra prediction mode.

12. The non-transitory computer readable medium of claim 11, further containing instructions that when executed cause the at least one processor to:
determine, based on the integer, that the block of the first color component and the block of the second color component are related using 4-4-4 sampling.

13. The non-transitory computer readable medium of claim 11, wherein:
the first color component is a luma component,
the second color component is a chroma component, and the partitioning tree type is single tree.

14. The non-transitory computer readable medium of claim 11, further containing instructions that when executed cause the at least one processor to:
use the first value and the second value as input parameters for a lookup table; and
determine to use the planar intra prediction mode to predict the block of the second color component using the input parameters with the lookup table.

15. The non-transitory computer readable medium of claim 11, further containing instructions that when executed cause the at least one processor to:
derive a value for a Mip chroma direct flag; and
in response to a determination that the value of the Mip chroma direct flag is zero, determine to use the planar intra prediction mode to predict the block of the second color component.

* * * * *